(12) United States Patent
Chassaigne et al.

(10) Patent No.: US 12,709,170 B2
(45) Date of Patent: Aug. 18, 2026

(54) CONTACTLESS ELECTRICAL ENERGY TRANSFER DEVICE

(71) Applicant: Airbus SAS, Blagnac (FR)

(72) Inventors: Didier Chassaigne, Blagnac (FR); Richard Perraud, Blagnac (FR); Ivan Revel, Blagnac (FR)

(73) Assignee: Airbus SAS, Blagnac (FR)

( * ) Notice: Subject to any disclaimer, the term of this patent is extended or adjusted under 35 U.S.C. 154(b) by 896 days.

(21) Appl. No.: 18/150,819

(22) Filed: Jan. 6, 2023

(65) Prior Publication Data

US 2023/0223788 A1 Jul. 13, 2023

(30) Foreign Application Priority Data

Jan. 10, 2022 (FR) ...................................... 2200137

(51) Int. Cl.
*H01M 10/46* (2006.01)
*B60L 53/126* (2019.01)
(Continued)

(52) U.S. Cl.
CPC .......... *B60L 53/126* (2019.02); *B60R 16/033* (2013.01); *H01F 27/38* (2013.01);
(Continued)

(58) Field of Classification Search
CPC .......... H02J 50/005; H02J 50/10; H02J 50/40; H02J 7/0042; B60L 53/126; B60L 53/38; B60L 53/36
(Continued)

(56) References Cited

U.S. PATENT DOCUMENTS

| | | | | |
|---|---|---|---|---|
| 9,387,928 B1 * | 7/2016 | Gentry | .................. | B64U 50/39 |
| 2014/0070764 A1 | 3/2014 | Keeling | | |

(Continued)

FOREIGN PATENT DOCUMENTS

| | | |
|---|---|---|
| CN | 108688496 B | 12/2019 |
| JP | 2018029452 A * | 2/2018 |

(Continued)

OTHER PUBLICATIONS

Machine translate of KR-10-2016-0015716 (Feb. 15, 2016) (Year: 2016).*
French Search Report dated Jul. 22, 2022; priority document.

*Primary Examiner* — Edward Tso
(74) *Attorney, Agent, or Firm* — Greer, Burns & Crain, Ltd.

(57) ABSTRACT

A contactless electrical energy transfer device including a first system which includes at least one first coil including at least one first winding around at least one first zone without wire, a layer of ferromagnetic elements, at least one small column passing through the first coil by passing through a first zone without wire, and a second system which includes at least one second coil including at least one second winding around at least one second zone without wire. The small column or columns make it possible to optimize the magnetic coupling coefficient despite the absence of a layer of ferromagnetic elements in the second system. Also, a flying vehicle fitted with rechargeable batteries and its recharging base, both equipped with the electrical energy transfer device are provided.

18 Claims, 3 Drawing Sheets

(51) Int. Cl.

| | |
|---|---|
| ***B60R 16/033*** | (2006.01) |
| ***H01F 27/38*** | (2006.01) |
| ***H02J 50/00*** | (2016.01) |
| ***H02J 50/10*** | (2016.01) |
| ***H02J 50/40*** | (2016.01) |

(52) U.S. Cl.
CPC ............ *H02J 50/005* (2020.01); *H02J 50/10* (2016.02); *H02J 50/40* (2016.02)

(58) Field of Classification Search
USPC ................................. 320/107, 108, 114, 115
See application file for complete search history.

(56) References Cited

U.S. PATENT DOCUMENTS

| | | | | |
|---|---|---|---|---|
| 2018/0056794 | A1* | 3/2018 | Kim | B60L 53/126 |
| 2019/0348862 | A1* | 11/2019 | Obayashi | B64U 30/21 |
| 2020/0055599 | A1 | 2/2020 | Kodaira et al. | |

FOREIGN PATENT DOCUMENTS

| | | | |
|---|---|---|---|
| KR | 20160015716 | A | 2/2016 |
| WO | 2014042789 | A1 | 3/2014 |

* cited by examiner 22
28
12
26
24
E0
F22
F14
-30-
16
18
10
20
14

A60
A60
F58'
F60'
60.1
60.2
60
58
62
34
F60
F58
-36-
64
64.2
A50
64
64.2
A50
50.1
50.2
50
F50
L
F48
56
48
32
52
54
64.1
64.1
F50'

A50
A50
50.2
50.1
50
50.1
50.2
64.2
64.2
64
64
52
54
64.1
64.1

CONTACTLESS ELECTRICAL ENERGY TRANSFER DEVICE

CROSS-REFERENCES TO RELATED APPLICATIONS

This application claims the benefit of the French patent application No. 2200137 filed on Jan. 10, 2022, the entire disclosures of which are incorporated herein by way of reference.

FIELD OF THE INVENTION

The present application relates to a contactless electrical energy transfer device and a flying vehicle provided with rechargeable batteries, and to an electrical recharging base equipped with the electrical energy transfer device.

BACKGROUND OF THE INVENTION

According to a first embodiment visible in FIG. 1, a contactless electrical energy transfer device comprises an electrical energy transmitter system 10 and an electrical energy receiver system 12, the transmitter and receiver systems being mobile with respect to one another and configured to allow a transfer of electrical energy by magnetic induction when they are close to one another.

The transmitter system 10 comprises a first housing 14 which has a first face F14 oriented towards the receiver system 12. It also comprises, inside the first housing 14, moving away from the first face F14, at least one first coil 16, also called transmitting coil, positioned in the first housing 14, a layer of ferromagnetic elements 18, made of ferrite for example, and a shielding plate 20.

The receiver system 12 comprises a second housing 22 which has a second face F22 oriented towards the transmitter system 10. It also comprises, inside the second housing 22, moving away from the second face F22, at least one second coil 24, also called receiving coil, positioned in the second housing 22, a layer of ferromagnetic elements 26, made of ferrite for example, and a shielding plate 28.

According to this first embodiment, the transmitter and receiver systems 10 and 12 comprise the same elements arranged symmetrically.

According to one configuration, the first and second coils 16, 24 each have a double-D form and the first and second housings 14, 22 are filled with a filling resin.

In operation, during a transfer of electrical energy, the transmitter and receiver systems 10, 12 are separated by a gap 30. The first and second coils 16, 24 have a magnetic coupling coefficient which decreases as a function of the thickness E0 of the gap 30 separating the first and second coils 16, 24. The presence of the layers of ferromagnetic elements 18, 26 makes it possible to maintain a satisfactory magnetic coupling coefficient to ensure the transfer of electrical energy, and to do so despite a gap of the order of 50 cm for example.

Although this first embodiment operates with significant gaps, the layers of ferromagnetic elements 18, 26 representing approximately a third of the total weight of each transmitter or receiver system 10, 12, their presence makes this contactless electrical energy transfer device difficult to use in the aeronautical field.

According to a second embodiment, the layers of ferromagnetic elements 18, 26 can be replaced by a layer of resin filled with ferromagnetic particles. This solution is valid for the small contactless electrical energy transfer devices.

However, in the case of a device of large dimensions suited to an electrical flying vehicle of eVTOL (electric vertical take-off and landing) type, the weight saving is insignificant.

SUMMARY OF THE INVENTION

The present invention aims to wholly or partly remedy the drawbacks of the prior art.

To this end, a subject of the invention is a contactless electrical energy transfer device comprising a first system out of an electrical energy transmitter system and an electrical energy receiver system, and a second system, different from the first system, out of an electrical energy transmitter system and an electrical energy receiver system, the first system comprising a first housing which has a first face oriented towards the second system when the first and second systems are magnetically coupled, and moving away from the first face, at least one first coil and a layer of ferromagnetic elements positioned in the first housing, the first coil comprising at least one first winding around at least one first zone without wire and a first winding axis at right angles to the first face, the second system comprising a second housing which has a second face oriented towards the first system when the first and second systems are magnetically coupled and at least one second coil positioned in the second housing, the second coil comprising at least one second winding around at least one second zone without wire and a second winding axis.

According to the invention, the first system comprises at least one small column extending between first and second ends and having a longitudinal direction linking the first and second ends parallel to the first winding axis, the small column passing through the first coil by passing through a first zone without wire. According to the invention, the second system comprises, in the second housing, a resin filled with ferromagnetic particles.

Given equal coupling distance, the presence of small columns makes it possible to increase the magnetic coupling coefficient or to maintain an optimum thereof despite the absence of layer of ferromagnetic elements in the second system. The presence of a resin filled with ferromagnetic particles in the second system makes it possible to enhance the magnetic coupling coefficient, without excessively adding to the weight of the second system.

According to another feature, the first end of the small column is separated from the layer of ferromagnetic elements by a distance less than 3 mm.

According to another feature, the first end of the small column is in contact with the layer of ferromagnetic elements.

According to another feature, the second end of the small column protrudes with respect to the first face of the first housing.

According to another feature, the first and second coils being separated by a coupling distance when the first and second systems are magnetically coupled, the small column has a length greater than 25% of the coupling distance.

According to another feature, the first system comprises at least one small column for each first zone without wire.

According to another feature, the small column or columns have a section representing at least 50% of the surface area of the first zone without wire that it or they pass through.

According to another feature, each small column is made of ferromagnetic material.

According to another feature, the second coil having an inner face oriented towards the second face of the second housing, an outer face opposite the inner face and a thickness corresponding to a distance separating the inner and outer faces, the volume of filled resin takes the form of a body arranged between the outer face of the second coil and a first face of the second housing opposite the second face of the second housing, and at least one extension passing through at least one second zone without wire of the second coil, towards the second face of the second housing.

According to another feature, each extension of the volume of filled resin has a section equal to or slightly less than that of the second zone without wire that it passes through.

According to another feature, the body of the volume of filled resin covers half the outer face of the second coil.

According to another feature, the body has a thickness greater than or equal to twice the thickness of the second coil.

According to another feature, each extension of the volume of filled resin has a portion, protruding with respect to the inner face of the second coil, which has a height greater than at least twice the thickness of the second coil.

According to another feature, the height of the protruding portion is greater than or equal to 5% of a distance separating the first and second systems when the first and second systems are magnetically coupled.

Also a subject of the invention is a flying vehicle comprising at least one rechargeable battery and a second system of a contactless electrical energy transfer device according to one of the preceding features.

Also a subject of the invention is an electrical recharging base for a flying vehicle comprising a first system of a contactless electrical energy transfer device according to one of the preceding features.

BRIEF DESCRIPTION OF THE DRAWINGS

Other features and advantages will emerge from the following description of the invention, a description given purely by way of example and in light of the attached drawings in which.

DETAILED DESCRIPTION OF THE PREFERRED EMBODIMENTS

Figures 1, 2, 3:
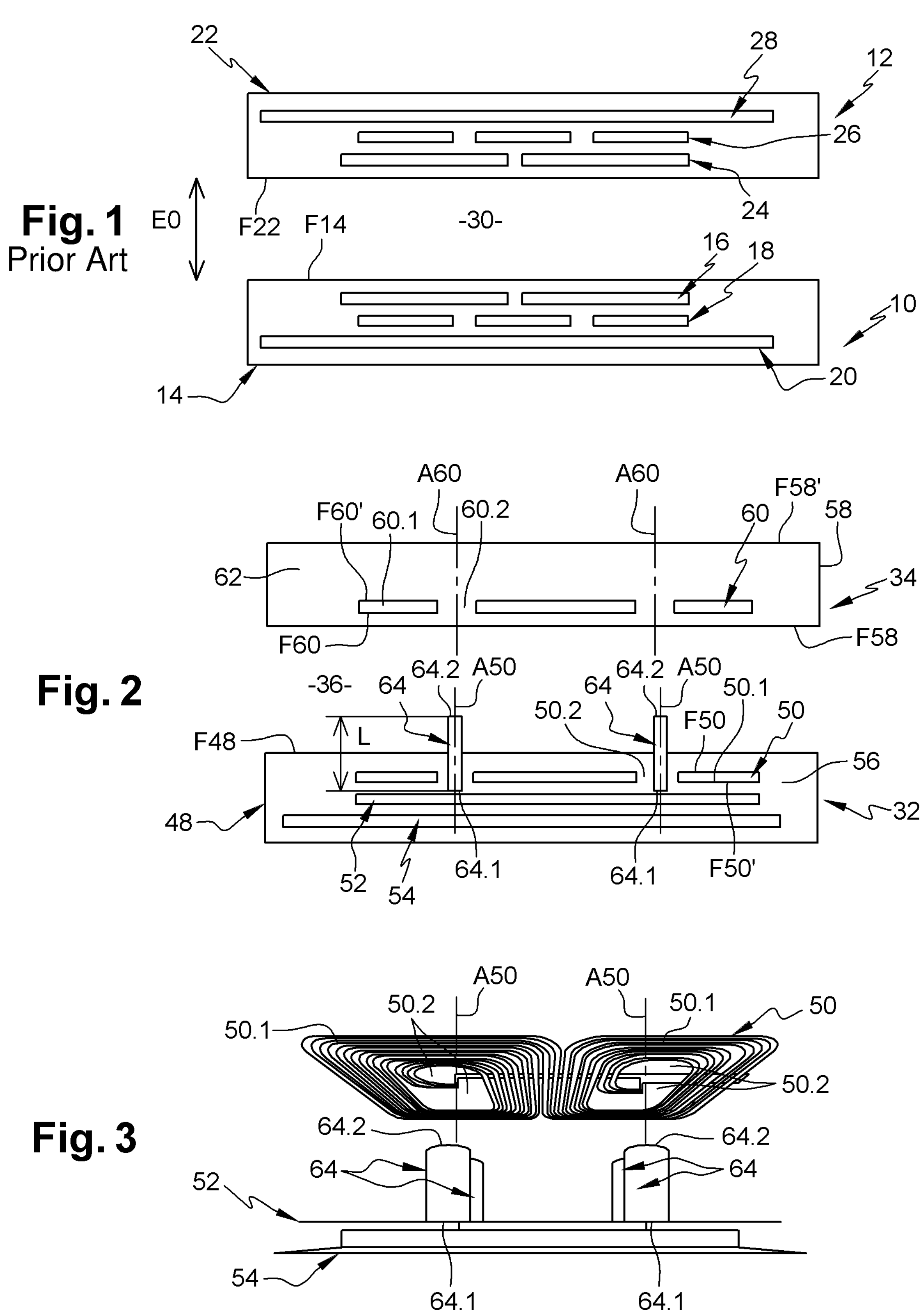
FIG. 1 is a schematic representation of a contactless electrical energy transfer device illustrating an embodiment of the prior art.
FIG. 2 is a schematic representation of a contactless electrical energy transfer device illustrating a first embodiment of the invention.
FIG. 3 is a schematic perspective view of a transmitter system of the contactless electrical energy transfer device visible in FIG. 2.
Figure 4:
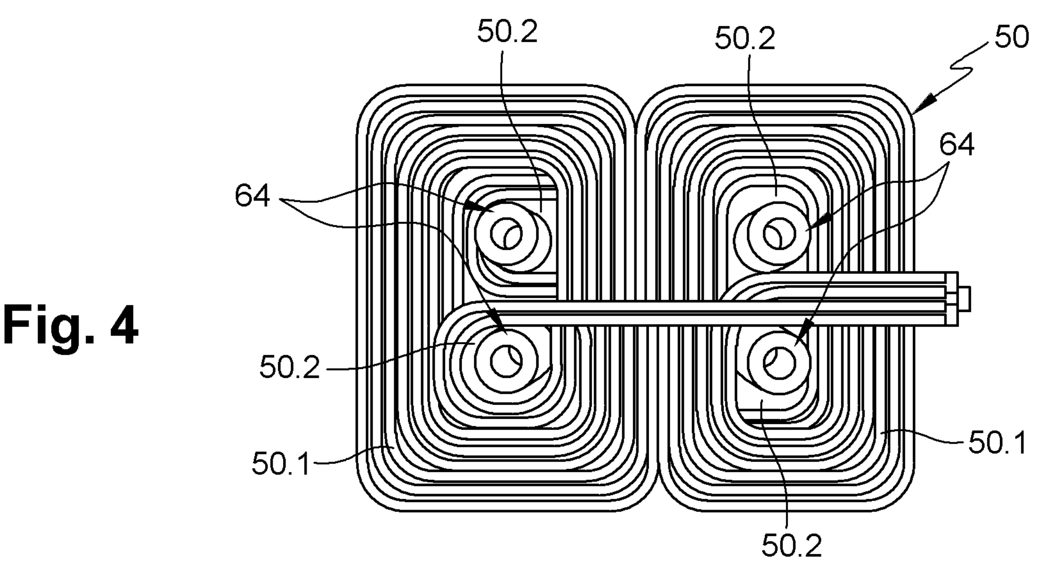
FIG. 4 is a schematic top view of the transmitter system visible in FIG. 3.

According to a first embodiment visible in FIGS. 2 to 4, a contactless electrical energy transfer device comprises an electrical energy transmitter system 32 and an electrical energy receiver system 34, the transmitter and receiver systems 32, 34 being mobile with respect to one another and configured to allow a transfer of electrical energy by magnetic induction when they are close to one another.

In operation, during a transfer of electrical energy, the transmitter system 32 and the receiver system 34 are separated by a gap 36 allowing a transfer of electrical energy by a magnetic coupling between the transmitter and receiver systems 32, 34. The transmitter and receiver systems 32, 34 have a magnetic coupling coefficient that is a function of their characteristics and their separation.

According to one application, a flying vehicle 38 of eVTOL (electric vertical take-off and landing) type comprises at least one rechargeable battery 40, a regulation system 42 configured to regulate the charge of the rechargeable battery 40 and a receiver system 34 linked to the regulation system 42. An electrical recharging base 44, configured to recharge the rechargeable battery 40 of the flying vehicle 38, comprises a transmitter system 32 linked to a source of electrical energy 46 and incorporated or not incorporated in the electrical recharging base 44. According to this application, during the transfer of electrical energy, the gap 36 has a thickness of the order of 50 cm.

Obviously, the invention is not limited to this application.

According to this first embodiment, the transmitter system 32 comprises a first housing 48 which has a first face F48 oriented towards the receiver system 34. The transmitter system 32 also comprises, inside the first housing 48, moving away from the first face F48, at least one first coil 50, also called transmitting coil, positioned in the first housing 48, a layer of ferromagnetic elements 52, made of ferrite for example, and a shielding plate 54. The first housing 48 generally contains a first resin 56 for immobilizing and protecting the various elements present in the first housing 48.

According to one configuration, the first coil 50 has a double-D form. Regardless of the embodiment, the first coil 50 comprises at least one first winding 50.1 around at least one first zone without wire 50.2 (the wire of the first winding 50.1 being wound around the first zone without wire 50.2), having a first winding axis A50. According to one arrangement, the first winding axis A50 is at right angles to the first face F48. The first winding 50.1 can be substantially flat. The first coil 50 has an inner face F50 oriented towards the first face F48 of the first housing 48 and an outer face F50' opposite the inner face.

The receiver system 34 comprises a second housing 58 which has a first face F58' and a second face F58 opposite the first face F58' and oriented towards the transmitter system 32, and at least one second coil 60 positioned inside the second housing 58. The second housing 58 generally contains a second resin 62 for immobilizing and protecting the various elements present in the second housing 58.

According to this configuration, the receiver system 34 does not comprise a layer of ferromagnetic elements and a shielding plate. Thus, with identical dimensions, the receiver system 34 has a weight 45% less than that of a receiver system of the prior art. Consequently, the contactless electrical energy transfer device according to the invention is suited to the aeronautical field and the receiver system 34 can be incorporated in a flying vehicle 38.

According to one configuration, the second coil 60 has a double-D form. Regardless of the embodiment, the second coil 60 comprises at least one second winding 60.1, around at least one second zone without wire 60.2 (the wire of the second winding 60.1 being wound around the second zone without wire 60.2), having a second winding axis A60. According to one arrangement, the second winding axis A60 is at right angles to the second face F58. The second winding

60.1 can be substantially flat. The second coil 60 has an inner face F60 oriented towards the second face F58 of the second housing 58 and an outer face F60' opposite the inner face.

In operation, during magnetic coupling, the first and second winding axes A50, A60 of the first and second coils 50, 60 are substantially parallel. The first and second coils 50, 60 are separated by a coupling distance (distance measured in a direction approximately parallel to the first or second winding axis A50, A60) when the transmitter and receiver systems 32 34 are immobile with respect to one another and a transfer of electrical energy takes place between the systems 32, 34.

According to the first embodiment visible in FIGS. 2 to 4, the transmitter system 32 comprises at least one small column 64 having a longitudinal direction parallel to the winding axis A50 and passing through the first coil 50 by passing through a first zone without wire 50.2. Each small column 64 extends between first and second ends 64.1, 64.2. The longitudinal direction corresponds to the direction linking the first and second ends 64.1, 64.2 of the small column 64.

In a transverse plane at right angles to the longitudinal direction, the small column 64 has a round or square section or any other form.

A small column 64 is understood to be an element which has a length, the dimension measured in the longitudinal direction, greater than any other dimension of the element.

According to a particular feature, the first end 64.1 of the small column 64 is separated from the layer of ferromagnetic elements 52 by a distance less than 3 mm.

According to one configuration, the first end 64.1 of the small column 64 is in contact with the layer of ferromagnetic elements 52. This configuration makes it possible to increase the effect obtained by the small column 64.

The second end 64.2 of the small column 64 protrudes with respect to the first face F48.

Each small column 64 has a length L (corresponding to the distance separating the first and second ends) greater than 25% of the coupling distance. According to one configuration, the length L of each small column 64 is approximately equal to 50% of the coupling distance. In this case, the magnetic coupling coefficient is increased by 25% compared to a solution without small column.

According to one embodiment, for each first winding 50.1, the transmitter system 32 comprises at least one small column 64, the section of which covers at most each first zone without wire 50.2 of the winding 50.1. According to an arrangement visible in FIGS. 3 and 4, the transmitter system 32 comprises two small columns 64 for each first winding 50.1. In the case of a first coil in double-D form defining two first windings 50.1, the transmitter system 32 comprises four small columns 64, two for each first winding 50.1.

Regardless of the arrangement, for each first winding 50.1, the sum of the sections of the small columns 64 or the section of the single small column 64 represents at least 50% of the surface area of the first zone or zones without wire 50.2, preferably at least 75% of the surface area, and even more preferentially at least 90% of the surface area.

Each small column 64 can be solid or hollow. The small column 64 can have a length that is fixed or telescopic (i.e., which elongates during the energy transfer phases and retracts outside of the energy transfer phases).

According to one embodiment, each small column 64 is made of ferromagnetic material.

In the case of a contactless electrical energy transfer device suitable for a flying vehicle, only the transmitter system 32 comprises at least one small column 64.

For other applications, the transmitter and receiver systems 32, 34 each comprise at least one small column 64. As a variant, only the receiver system 34 comprises at least one small column 64, the transmitter system not having one.

According to one configuration, the first or second resin 56, 62 of the first or second housing 48, 58 occupies all the free volume of the first or second housing 48, 58.

Figure 5:
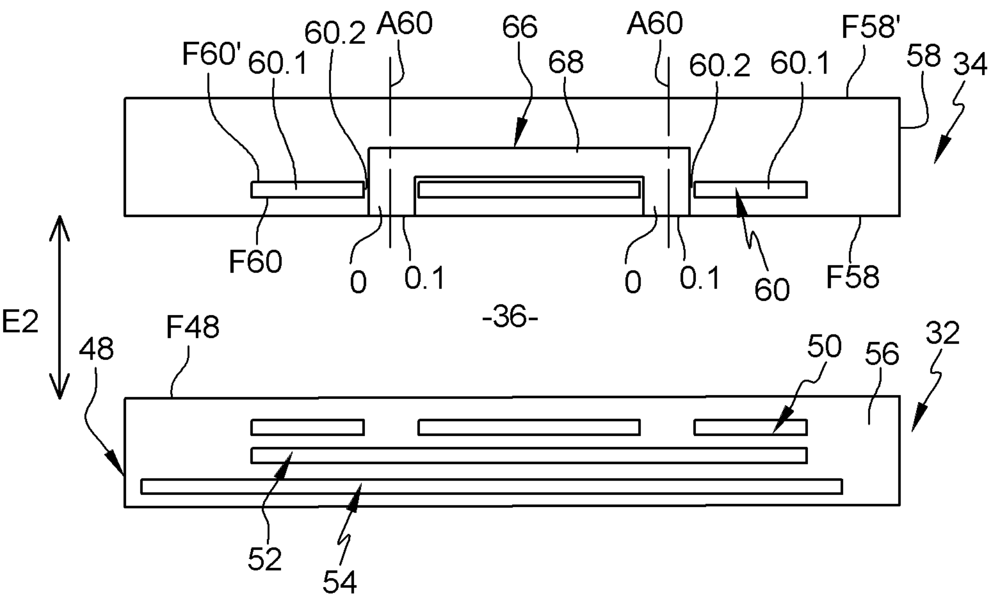
FIG. 5 is a schematic representation of a contactless electrical energy transfer device illustrating a second embodiment of the invention.
Figure 6:
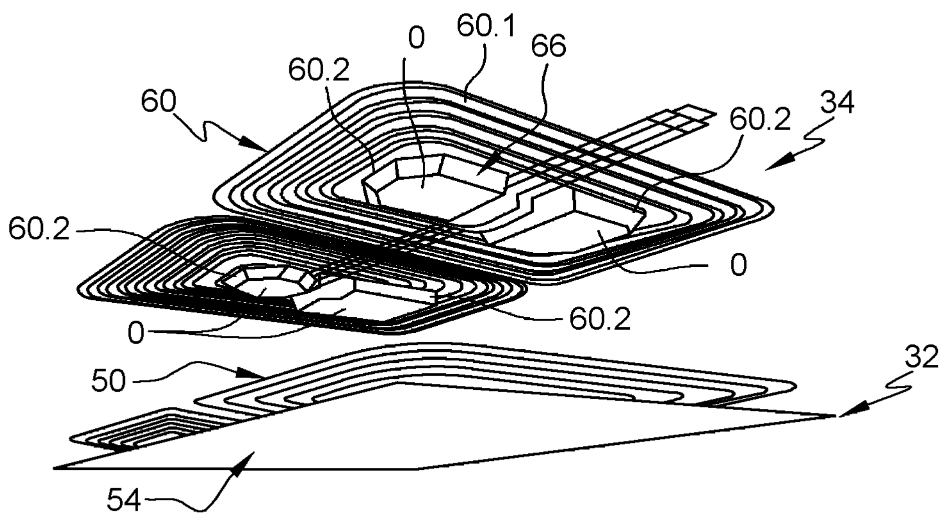
FIG. 6 is a schematic perspective view of the contactless electrical energy transfer device visible in FIG. 5.
Figure 7:
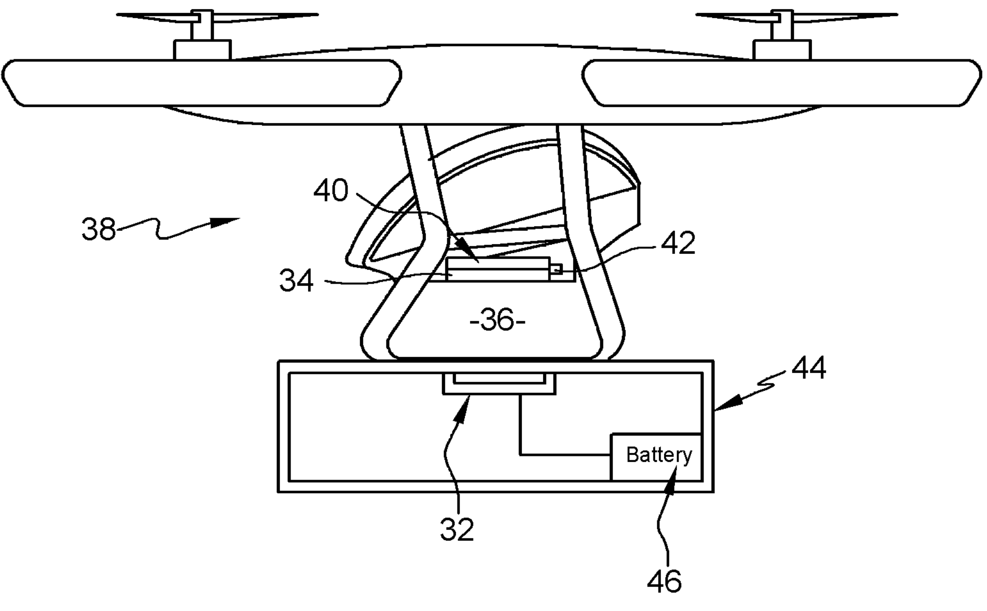
FIG. 7 is a side view of a flying vehicle fitted with rechargeable batteries and an electrical recharging base illustrating an embodiment of the invention.

According to a second embodiment visible in FIGS. 5 and 6, the receiver system 34 comprises neither a layer of electromagnetic elements nor a shielding plate. The second resin 62 of the second housing 58 is filled with ferromagnetic particles.

As an example, this filled filling resin 62 can be a resin, marketed under the reference TS-1S35, comprising ferromagnetic flakes embedded in a polyamide resin having a relative permeability of between 40 and 50.

According to this second embodiment, the second resin 62 does not occupy all the free volume of the second housing 58. The second resin 62 occupies a volume of filled resin 66 that is optimized in light of the ratio between the magnetic coupling coefficient and the weight of the receiver system 34.

According to one arrangement, the volume of filled resin 66 takes the form of a body 68 arranged between the outer face F60' of the second coil 60 and the first face F58' of the second housing 58, and at least one extension 70 passing through at least one second zone without wire 60.2 of the winding 60.1 of the second coil 60, towards the second face F58 of the second housing 58. According to one arrangement, the volume of filled resin 66 comprises an extension 70 for each second zone without wire 60.2 of the second coil 60.

According to one configuration, the body 68 of the volume of filled resin 66 is approximately parallelepipedal. Each extension 70 of the volume of filled resin 66 has a section equal to or slightly less than that of the second zone without wire 60.2 that it passes through.

According to another feature, the body 68 of the volume of filled resin 66 covers approximately half the outer face F60' of the second coil 60. The body 68 of the volume of filled resin 66, for example, covers between 45% and 55% of the outer face F60' of the second coil 60. The body 68 has a thickness (dimension measured parallel to the second winding axis A60) greater than or equal to twice the thickness (distance separating the inner and outer faces) of the second coil 60.

Each extension 70 of the volume of filled resin 66 has a portion 70.1 protruding with respect to the inner face F60 of the second coil 60. The portion 70.1 protruding with respect to the inner face F60 has a height (dimension measured parallel to the second winding axis A60) greater than at least twice the thickness of the second coil 60. This height is greater than or equal to 5% of the gap 36 during a transfer of electrical energy.

Although not represented, the first and second embodiments are compatible. Thus, the transmitter system 32 comprises at least one small column 64 as described previously, whereas the receiver system 34 comprises a second resin 62 filled with ferromagnetic particles as described previously.

Produced thus, the receiver system 34 has a magnetic coupling coefficient that is reduced by 10% compared to a transmitter system of the prior art comprising a layer of ferromagnetic elements, but a weight saving greater than 20% compared to the same transmitter system of the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A contactless electrical energy transfer device comprising:

an electrical energy transmitter system and an electrical energy receiver system, the electrical energy transmitter system comprising:

a first housing which has a first face oriented towards the second system when the first and second systems are magnetically coupled, and moving away from the first face, at least one first coil and a layer of ferromagnetic elements positioned in the first housing, the first coil comprising at least one first winding around at least one first zone without wire and a first winding axis at right angles to the first face, the electrical energy receiver system comprising:

a second housing which has a second face oriented towards the first system when the first and second systems are magnetically coupled, and at least one second coil positioned in the second housing, the second coil comprising at least one second winding around at least one second zone without wire and a second winding axis;

wherein the electrical energy transmitter system comprises at least one small column extending between first and second ends and having a longitudinal direction linking the first and second ends parallel to the first winding axis, said at least one small column passing through the first coil by passing through the first zone without wire, and wherein the electrical energy receiver system comprises, in the second housing, a resin filled with ferromagnetic particles.

2. The contactless electrical energy transfer device according to claim 1, wherein the first end of each of the at least one small column is in contact with the layer of ferromagnetic elements.

3. The contactless electrical energy transfer device according to claim 1, wherein the second end of each of the at least one small column protrudes with respect to the first face of the first housing.

4. The contactless electrical energy transfer device according to claim 3, wherein the first and second coils are separated by a coupling distance when electrical energy transmitter system and the electrical energy receiver system are magnetically coupled, and wherein each of the at least one small column has a length greater than 25% of the coupling distance.

5. The contactless electrical energy transfer device according to claim 1, wherein the electrical energy transmitter system comprises the at least one small column for each first zone without wire.

6. The contactless electrical energy transfer device according to claim 5, wherein the at least one small column has a section representing at least 50% of a surface area of the first zone without wire that the at least one small column passes through.

7. The contactless electrical energy transfer device according to claim 1, wherein each of the at least one small column is made of ferromagnetic material.

8. The contactless electrical energy transfer device according to claim 1, wherein the second coil has an inner face oriented towards the second face of the second housing, an outer face opposite the inner face and a thickness corresponding to a distance separating the inner and outer faces, and wherein a volume of filled resin is formed as a body arranged between the outer face of the second coil and a first face of the second housing opposite the second face of the second housing, and at least one extension passing through at least one second zone without wire of the second coil, towards the second face of the second housing.

9. The contactless electrical energy transfer device according to claim 8, wherein each of the at least one extension of the volume of filled resin has a section equal to or slightly less than that of the second zone without wire that the extension passes through.

10. The contactless electrical energy transfer device according to claim 8, wherein the body of the volume of filled resin covers half the outer face of the second coil.

11. The contactless electrical energy transfer device according to claim 8, wherein the body has a thickness greater than or equal to twice the thickness of the second coil.

12. The contactless electrical energy transfer device according to claim 8, wherein each of the at least one extension of the volume of filled resin has a portion, protruding with respect to the inner face of the second coil, which has a height greater than at least twice the thickness of the second coil.

13. The contactless electrical energy transfer device according to claim 12, wherein the height of the protruding portion is greater than or equal to 5% of a distance separating the electrical energy transmitter system and the electrical energy receiver system when the electrical energy transmitter system and the electrical energy receiver system are magnetically coupled.

14. A flying vehicle comprising at least one rechargeable battery and an electrical energy receiver system of a contactless electrical energy transfer device according to claim 1.

15. An electrical recharging base for a flying vehicle comprising an electrical energy transmitter system of a contactless electrical energy transfer device according to claim 1.

16. The contactless electrical energy transfer device according to claim 1, wherein the second winding axis of the at least one second winding is at right angles to the second face.

17. The contactless electrical energy transfer device according to claim 1, wherein the first end of each of the at least one small column is in contact with the layer of ferromagnetic elements, each of the at least one small column being made of ferromagnetic material.

18. A contactless electrical energy transfer device comprising:

an electrical energy transmitter system and an electrical energy receiver system, the electrical energy transmitter system comprising:

a first housing which has a first face oriented towards the second system when the first and second systems are magnetically coupled, and moving away from the first face, at least one first coil and a layer of ferromagnetic elements positioned in the first housing, the first coil comprising at least one first winding around at least one first zone without wire and a first winding axis at right angles to the first face, the electrical energy receiver system comprising:

a second housing which has a second face oriented towards the first system when the first and second systems are magnetically coupled, and at least one second coil positioned in the second housing, the second coil comprising at least one second winding around at least one second zone without wire and a second winding axis;

wherein the electrical energy transmitter system comprises at least one small column extending between first and second ends and having a longitudinal direction linking the first and second ends parallel to the first winding axis, said at least one small column passing through the first coil by passing through the first zone without wire, wherein the electrical energy receiver system comprises, in the second housing, a resin filled with ferromagnetic particles, wherein the second coil has an inner face oriented towards the second face of the second housing, an outer face opposite the inner face and a thickness corresponding to a distance separating the inner and outer faces, and wherein a volume of filled resin is formed as a body arranged between the outer face of the second coil and a first face of the second housing opposite the second face of the second housing, and at least one extension passing through at least one second zone without wire of the second coil, towards the second face of the second housing.

* * * * *